July 10, 1962
G. ALFIERI
3,043,930
DISTRIBUTOR FOR BRAKING PLANTS WITH EMBODIED
STOP-LAMP SWITCH, PARTICULARLY FOR VEHICLES
Filed July 7, 1959
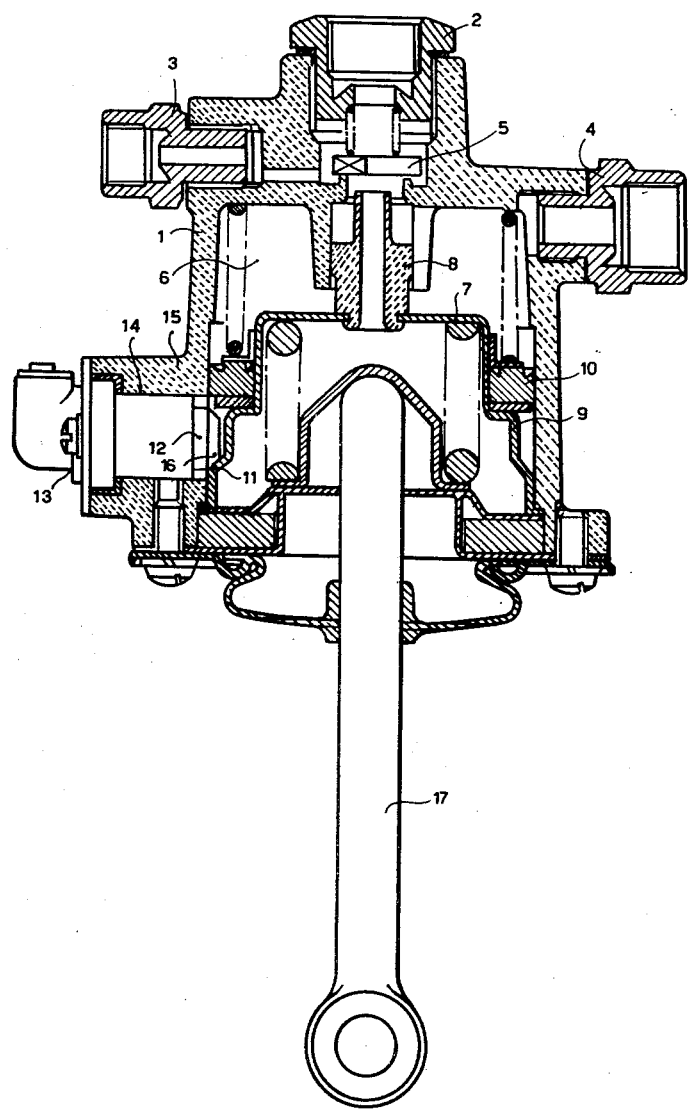
INVENTOR.
GIUSEPPE ALFIERI
BY Harold T. Stowell
Harold L. Stowell
ATTORNEYS

United States Patent Office 3,043,930
Patented July 10, 1962

3,043,930
DISTRIBUTOR FOR BRAKING PLANTS WITH EMBODIED STOP-LAMP SWITCH, PARTICULARLY FOR VEHICLES
Giuseppe Alfieri, Milan, Italy, assignor to Fabbrica Italiana Magneti Marelli S.p.A., Milan, Italy, a firm
Filed July 7, 1959, Ser. No. 825,595
Claims priority, application Italy July 9, 1958
1 Claim. (Cl. 200—83)

The invention relates to a stop light switch associated with the pressure fluid distributing network of a pneumatic braking system for vehicles.

It is known that the braking of a vehicle is indicated through stop lights that light upon the application of the pressure to the braking system.

In the case of a vehicle provided with a pneumatic brake system, the depression of the brake pedal affects the operation of a pressure air distributor and contemporaneously therewith the closure of the signal light electric circuits through suitable contacts which are associated with the brake pedal.

It is an object of the present invention to produce a new fluid distributor which embodies a switch for lighting vehicle stop lights. The switch is arranged in such a manner as to close the stop light signal circuit whenever the fluid distributor plunger controlling the switch is moved away from its rest position.

According to a preferred embodiment of the invention, the movable part of the switch is moved by the fluid distributor plunger in a perpendicular direction to the motion of the plunger, thereby effecting an operative coupling between the movable part of the switch and the plunger.

The invention is illustrated by way of an example referring to the accompanying drawing, which shows a longitudinal section of a fluid distributor for pneumatic braking systems according to the invention.

The distributor is shown in the rest position.

In the drawing, reference numeral 1 indicates the distributor housing provided with the pipe connections 2, 3, and 4. The connection 2 is suitably coupled to an air compressor associated with the vehicle engine and the other connectors 3 and 4 are connected, respectively, to a pressure accumulator tank and to the individual brake conduits. The pressure fluid is fed to the connector 4 and thence to the individual brake elements through an inlet valve 5 when the latter is in an open position.

A chamber 6 is formed within the housing 1 wherein a plunger 7 is disposed for sliding movement therein. A projection 8 is formed with the plunger 7 and is adapted to open the normally closed inlet valve 5.

The plunger 7 is formed with a stepped peripheral configuration, the first of these steps 9 forms an annular support for the sealing gasket 10, and the next of these steps provides a sloping surface 11 which functions as a camming surface to engage the push rod 12 of a micro-switch 13. It will be noted that the gasket 10 effectively provides a tight sliding fit between the side wall of the plunger 7 and the interior wall of the housing 1. The micro-switch 13 is disposed perpendicularly with respect to the sliding axis of the plunger 7 in an appropriate chamber 14 provided in a side projection 15 of the housing 1. The end of the push rod 12 of the micro-switch 13 is provided with a camming surface 16 which extends into the interior of the housing 1 and is in sliding contact with the exterior surface 11 of the plunger 7 beneath the sealing gasket 10.

The end 16 of the micro-switch 13 is shaped as a truncated cone having its surface corresponding to the sloping surface 11 of the plunger with which it engages. The plunger 7 is connected to a rod 17 which, in turn is connected to the brake pedal of the associated vehicle.

In operation, the action of brake pedal through the rod 17 causes the plunger 7 to move upwardly. During the upward movement of the plunger 7, the inclined surface 11 thereof engages the camming surface 16 of the push rod 12 of microswitch 13. Upon actuation of the switch 13, the associate stop light circuit is closed to light the stop lights.

It will be noted that in operation there is a time lag or delay between the actuation of the micro-switch 13 and the actual application of the brakes. This is due to the fact that as the rod 17 is moved by the brake pedal, the micro-switch 13 is actuated before the projection 8 of the plunger 7 opens the inlet valve 5.

The main feature of the present invention consists in the particular coupling between the plunger 7 and the camming surface 16 of the micro-switch 13. This coupling and the disposition of the switch at right angles to the motion of the plunger 7 enables the application of a switch to the distributor housing 1 without size, space or stroke alterations in comparison with the known distributors with associated switches.

The employment of the surface of the plunger behind the sealing gasket 10 and disposition of the switch 13 outside of the pressure chamber 6 constitutes a further advantageous feature of the present invention.

With the present invention, pneumatic stresses of the switch, use of sealing gaskets and a particularly careful fitting thereof are avoided.

A signal in advance to the actual braking of the vehicle is further enabled by the present invention inasmuch as the switch is actuated as soon as the plunger stroke begins, whereas the inlet valve is opened only when the end of projection 8, by which it is lifted, has traveled through its initial stroke.

The embodiment according to the present invention provides the use of a plunger of sheet metal; it being understood, however, that the plunger may be satisfactorily made as machined member or otherwise.

In accordance with the provisions of the patent statutes, I have explained the principle and mode of operation of my invention and have illustrated and described what I now consider to represent its best embodiments. However, I desire to have it understood that, within the scope of the appended claim, the invention may be practiced otherwise than as specifically illustrated and described.

I claim:

A pressure fluid distributor for a pneumatic braking system comprising a housing, said housing having a fluid pressure inlet and a fluid pressure outlet, a normally closed valve between the pressure fluid inlet and the pressure fluid outlet, a cylindrical plunger disposed within said housing and adapted to slide therein within predetermined limits, said plunger having an inclined outer surface portion extending annularly thereabout, an extension on said plunger for selective engagement with said valve for opening the same when said plunger approaches one of its limits, an electric switch mounted on said housing, said switch having a normally open contact member associated therewith, said contact member extending into the interior of said housing and adapted to contact the inclined outer surface portion of said plunger, and means for effecting movement of said plunger within said housing to initially force said contact member in a direction to close said switch and then to cause said extension to engage and open said valve to allow pressure fluid to flow from the fluid pressure inlet to the fluid pressure outlet.

References Cited in the file of this patent

UNITED STATES PATENTS

| | | |
|---|---|---|
| 992,139 | Poche | May 9, 1911 |
| 1,960,662 | Como et al. | May 29, 1934 |
| 2,873,436 | Avrea | Feb. 10, 1959 |
| 2,899,516 | Smith | Aug. 11, 1959 |
| 2,902,557 | Brockman | Sept. 1, 1959 |
| 2,914,630 | Ralston | Nov. 24, 1959 |